United States Patent [19]

Miller

[11] Patent Number: 5,072,097
[45] Date of Patent: Dec. 10, 1991

[54] SPEED CONTROL FOR ROOF WELDING APPARATUS

[75] Inventor: Alfred A. Miller, Galveston, Tex.

[73] Assignee: Mweld, Inc., Nederland, Tex.

[21] Appl. No.: 319,542

[22] Filed: Mar. 6, 1989

[51] Int. Cl.$^5$ .............................................. H05B 1/02
[52] U.S. Cl. .................................... 219/497; 219/491; 219/494; 156/359
[58] Field of Search ................ 219/494, 497, 499, 501, 219/505, 508, 491, 509; 156/359; 307/117

[56] References Cited

U.S. PATENT DOCUMENTS

| | | | |
|---|---|---|---|
| 3,308,271 | 3/1967 | Hilbiber | 219/501 |
| 3,393,870 | 7/1968 | Jeffrey | 219/501 |
| 3,833,794 | 9/1974 | Moriyama | 219/502 |
| 4,370,546 | 1/1983 | Warner | 219/497 |
| 4,814,583 | 3/1989 | Rainey | 219/497 |

Primary Examiner—Mark H. Paschall
Attorney, Agent, or Firm—Arnold, White & Durkee

[57] ABSTRACT

A temperature sensitive motor control for use in roofing membrane welding devices is described. The control circuit gives an output impedance responsive to variations in the temperature of the welding device and ambient temperature. A thermocouple provides a voltage signal responsive to changes in the temperature of the heating plate of the welding device. An ambient temperature sensitive circuit element acts in conjunction with the input signal to provide an output signal that is responsive to both ambient temperature and heating plate temperature. The output signal is applied to a voltage variable impedance element which outputs an impedance that is a function of both application temperature and ambient temperature. In one preferred embodiment of the present invention, the ambient temperature sensitive circuit element is a thermistor. In an alternate preferred embodiment of the present invention, the ambient temperature sensitive circuit element is a diode-comparator circuit.

12 Claims, 4 Drawing Sheets

SPEED CONTROL FOR ROOF WELDING APPARATUS

BACKGROUND OF THE INVENTION

The present invention relates generally to motor control circuitry and more specifically to circuitry for controlling the speed of roofing membrane welding devices in response to temperature variations.

A commonly used roofing material is heat weldable asphalt roofing membrane. The roofing membrane generally comes in rolls of various standard widths and lengths of approximately 30 feet. The asphalt roofing membrane may be applied to the roof using a hot plate welding device such as that disclosed in U.S. Pat. No. 4,743,332 to Black. In using such a device, the operator unrolls a length of roofing membrane on the roof surface and propels the hot plate welding device between the roofing membrane and the roof surface. The welding device utilizes a heating plate to heat the asphalt membrane to a liquid state in order to weld the membrane to the roof surface.

The amount of heat transferred from the heating plate to the roofing membrane is directly related to the amount of the time the membrane contacts the heating plate. Moreover, the temperature at which the membrane is applied to the roof surface is related to the ambient temperature as well as the heat applied to the membrane. The amount of heat transferred to the roofing membrane may be regulated by varying the speed at which the roof welding device moves along the roof under the membrane. As the device moves faster, the membrane spends less time in contact with the heating plate, and application temperature decreases. Likewise, as the welding device moves more slowly, the application temperature of the roofing membrane increases.

When using the hot plate welding device, it is necessary to sufficiently heat the asphalt membrane to ensure a watertight seal between the membrane and the roof surface. Moreover, since the asphalt membrane usually comprises a fabric liner inside an asphaltic or bituminous coating, excessive heating of the roofing membrane may expose or damage the fabric base, destroying the integrity of the membrane. Therefore, the operator of the roof welding device must be constantly alert so that enough heat is applied to the roofing membrane to ensure a watertight seal while at the same time excess heat is not applied which may damage the integrity of the membrane.

Heretofore, the speed of the hot plate welding device along the roof surface has been controlled manually by the operator. The operator observes the bleed out of the asphaltic or bituminous substance on either side of the roofing membrane and adjusts the speed of the device manually to ensure that the bleed out is of a sufficient, but not excessive, amount. The prior methods and devices for welding roofing membrane to roof surfaces do not automatically control the speed of the device in response to the heat being applied to the asphalt roofing membrane and thus, it is difficult for the operator to ensure that sufficient heat is applied to the roofing membrane so that a watertight seal is formed between the membrane and the roof surface, without excessive heat damaging the integrity of the membrane.

Accordingly, the present invention provides an automatic motor control for roof welding devices which controls the speed of the device across the roof surface and thus the heat applied to a roofing membrane, in response to application temperature and in response to ambient temperature.

SUMMARY OF THE INVENTION

In one preferred embodiment, the present invention provides a control circuit for varying the speed of a drive motor of a roofing membrane welding device in response to application temperature and ambient temperature. The circuit provides a variable impedance output in response to two temperature variables: the heating plate temperature and ambient temperature. The variable impedance output is then applied as a load on a standard motor control circuit. A thermocouple attached to the heating plate of the welding device provides an input signal that varies according to the temperature of the heating plate. This input signal may be amplified by preamplification circuitry. An ambient temperature sensitive circuit element acts in conjunction with the thermocouple input signal to supply an output signal to a voltage variable impedance element. The voltage variable impedance element supplies a variable output impedance to a standard motor control circuit. The variable impedance causes the speed of the motor to vary. In a first preferred embodiment, the amplified thermocouple input signal is then varied in response to the ambient temperature by connecting in series with the preamplification circuitry a thermistor. The thermistor provides a resistive load on the circuit which varies inversely with temperature. The thermistor output may be amplified and calibrated and is applied to the voltage variable impedance device. In the first preferred embodiment, the voltage variable impedance device is a combination photoresistor and light source device. This device outputs a variable impedance in response to the input signal from the thermistor. The variable impedance is applied to the drive motor speed circuit to vary the speed of the roof welding device over the roof surface.

In a second preferred embodiment of the present invention, a thermocouple associated with the heating plate of the roof welding device provides an input signal to a preamplification circuit. The output signal from the preamplification circuit is connected to a plurality of comparator circuits. Each comparator circuit utilizes a reference voltage generated by a diode biased to operate exclusively in the region for which its output voltage is temperature dependent. The output of each comparator circuit is applied to a relay configured to switch on or off a resistor. The varying impedances controlled by the relay circuits are applied to the drive motor controls of the welding device. By using the plurality of comparator and relay circuits, a stepped impedance is applied as an input to the drive motor circuitry to vary the speed of the drive motor in response to temperature changes.

DETAILED DESCRIPTION OF THE PREFERRED EMBODIMENT

The circuitry of the present invention is a temperature dependent speed control circuit especially suitable for applications which demand that the speed of an apparatus be varied in response to varying temperatures. The following circuit descriptions are intended to illustrate two particular embodiments of the present invention. They are not to be construed as limiting the scope of the invention to the described embodiments. Those skilled in the art will recognize variations to the illustrated embodiments; the present invention is intended to encompass such variations.

Figure 1:
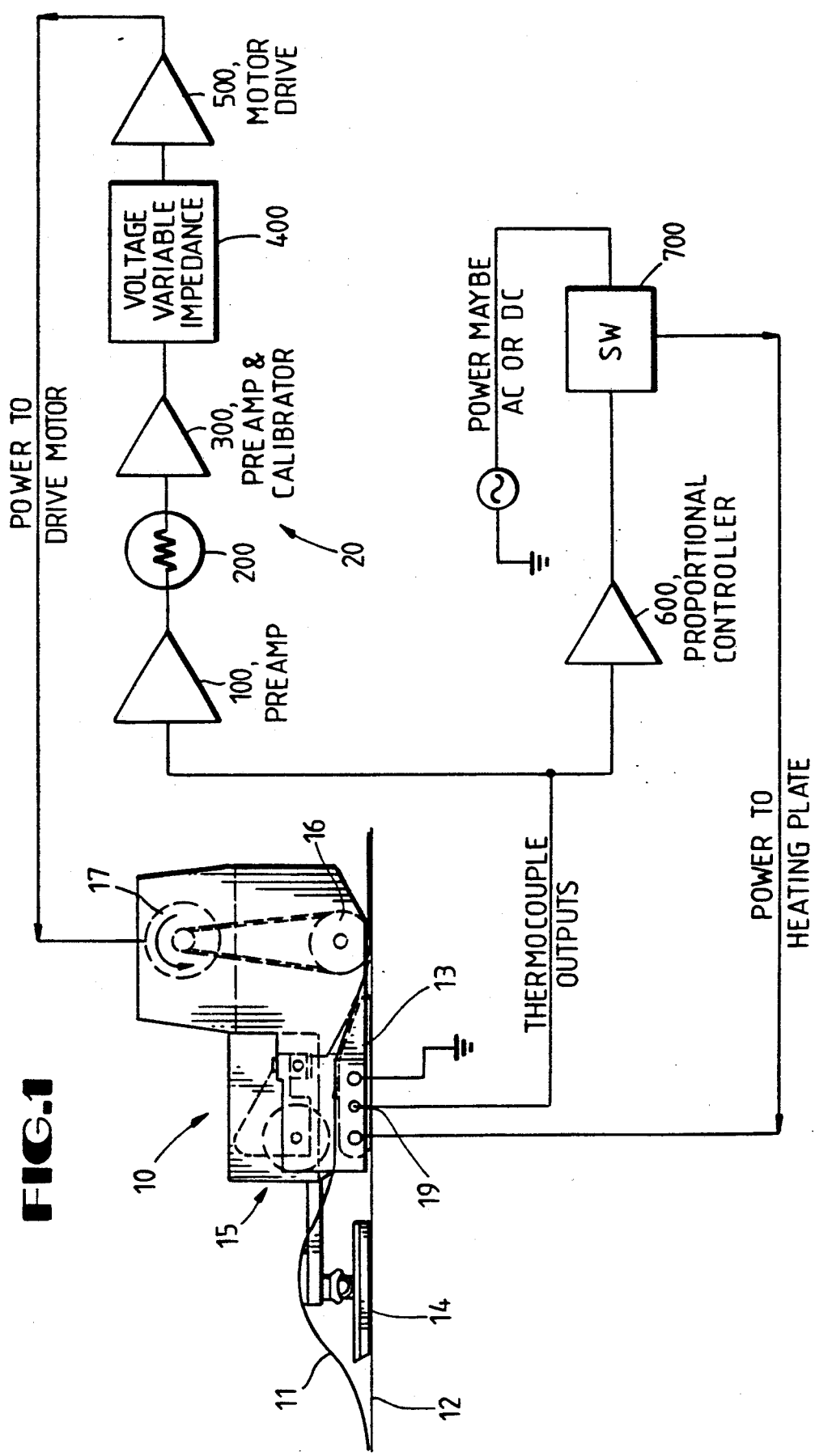
FIG. 1 schematically depicts a cross-section of a roofing membrane welding device together with a block diagram of the control circuitry of the present invention.

Referring first to FIG. 1, therein is schematically depicted a cross-section of a typical hot plate roofing membrane welding device 10 together with the temperature sensitive control circuitry 20 of the present invention. The hot plate welding device 10 is adapted to heat a length of asphalt roofing membrane 11 and apply membrane 11 to a roof surface 12. The welding device 10 generally includes a heating plate 13 adapted to heat membrane 11. Seam heaters 14 are provided to heat the seam portion of a previously applied length of roofing membrane. A pressure roller and pressure plate mechanism, indicated generally by reference numeral 15 ensures that membrane 11 contacts heating plate 13. Drive roller 16 presses membrane 11 into contact with roof surface 12. Drive roller 16 also serves to propel device 10 along the roof. Drive motor 17 operatively coupled to drive roller 16 provides motive power to drive roller 16 in order to propel device 10 along the roof under membrane 11. Membrane 11 passes over heating plate 13 which heats membrane 11 sufficiently to provide a watertight seal between membrane 11 and surface 12. After passing over heating plate 13, membrane 11 passes under drive roller 16, which presses membrane 11 into sealing contact with roof surface 12. The roofing membrane welding device schematically depicted in FIG. 1 and the operation of the device are fully described in U.S. Pat. No. 4,743,332 to Black and in application Ser. No. 07/091,390 filed May 9, 1988.

The present temperature sensitive control circuit invention is specifically used in the roofing device shown in FIG. 1 to control the speed at which drive motor 17 advances the roofing membrane welding device 10 along the roof, and, hence, the speed at which membrane 11 passes over heating plate 13. In order to provide a waterproof seal between membrane 11 and surface 12, membrane 11 must be sufficiently heated prior to its application to the roof surface 12. Those skilled in the art will recognize that the temperature at which membrane 11 is applied to surface 12 is determined by the heat transferred from heating plate 13 to membrane 11 as well as the initial temperature of membrane 11 before it contacts heating plate 13. This initial temperature of membrane 11 is in turn determined by the ambient temperature. Those skilled in the art will also recognize that the heat transferred from heating plate 13 to membrane 11 is proportional to the time the two are in contact. Therefore, the speed at which membrane 11 is passed over heating plate 13 must be regulated in order to ensure that sufficient heating occurs to provide waterproof application of membrane 11 to roof surface 12. The control circuitry of the present invention takes into account the temperature of heating plate 13 and the ambient temperature and adjusts the speed of welding device 10 to ensure that the proper amount of heat is transferred between heating plate 13 and membrane 11.

The present invention electronically translates the heating plate temperature and the ambient temperature into control signals which are then used to appropriately control drive motor 17. A thermocouple 19, which is preferably a J-type thermocouple, generates an input signal that varies with the temperature of heating plate 13. The thermocouple signal is input into preamplification circuitry 100.

The output of thermocouple 19 may also be used to control the power input to heating plate 13 in order to maintain heating plate 13 at a constant temperature. The output of thermocouple 19 may be applied to proportional controller 600, which is connected in series between thermocouple 19 and switch 700. The thermocouple output and the proportional controller 600 provide switch 700 with a signal generated in response to the temperature of heating plate 13. Switch 700 is in turn connected in series between an AC or DC power supply and heating plate 13. The opened and closed state of switch 700 is determined by the output of proportional controller 600. Thus, proportional controller 600 appropriately opens or closes switch 700 in order to cut off or pass, respectively, the power required to maintain heating plate 13 at a constant temperature.

Preamplification circuitry 100, connected in series between thermocouple output and ambient temperature sensitive device 200 provides device 200 with an amplified voltage signal which is proportional to the thermocouple output. In one preferred embodiment of the present invention, temperature sensitive device 200 is a thermistor whose impedance value is inversely proportional to the ambient temperature. Thus, the thermistor allows only a varying portion of the amplified thermocouple output signal to pass to the input of a second series connected preamplification and calibration circuit element 300. Preamp and calibration element 300 outputs a voltage signal which is a function of both the ambient temperature and the heating plate temperature.

The output signal of the preamp and calibration element 300 is applied to a voltage variable impedance element 400, which is connected in series between preamp and calibration element 300 and motor drive circuitry 500. Voltage variable impedance element 400 outputs a variable impedance in response to the variable voltage input. Because the voltage varies according to heating plate temperature and ambient temperature, the impedance output from voltage variable impedance element 400 is likewise dependent on heating plate temperature and ambient temperature.

The impedance output of element 400 is applied to a standard motor drive circuitry 500. The impedance output of element 400 controls the speed of drive motor 17 through motor drive circuitry 500. Depending on its value, the impedance input into drive motor circuitry 500 causes drive motor 17 to propel drive roller 16 faster or slower. Thus, the speed of welding device 10 varies according to the impedance output of element 400. More particularly, the variable impedance output from voltage variable impedance element 400 causes drive motor circuitry 500 to control the speed at which membrane 11 moves across heating plate 13. Therefore, the amount of heat transferred from heating plate 13 to membrane 11 is automatically controlled in response to temperature variations.

The arrangement of the circuit elements is such that as either the temperature of heating plate 13 or the ambient temperature changes, a varying voltage is input into voltage variable impedance element 400. This varying voltage causes the output impedance to change, providing a variable impedance input into drive motor circuitry 500. As discussed in detail with respect to FIGS. 2 and 3, an increase in either heating plate temperature or ambient temperature results in a decreased impedance output from voltage variable impedance element 400. When the impedance output of element 400 decreases, the motor drive circuitry 500 increases the speed of drive motor 17, allowing device 10 to move faster across roof surface 12. Hence, membrane 11 moves faster over heating plate 13 and less heat passes from heating plate 13 to membrane 11. Likewise, a decrease in the temperature of heating plate 13 or the ambient temperature will cause device 10 to move more slowly across roof surface 12 and, hence, to cause membrane 11 to move more slowly over heating plate 13. This permits more heat to be transferred from heating plate 13 to membrane 11, bringing the application temperature of membrane 11 to the desired temperature.

Figure 2:
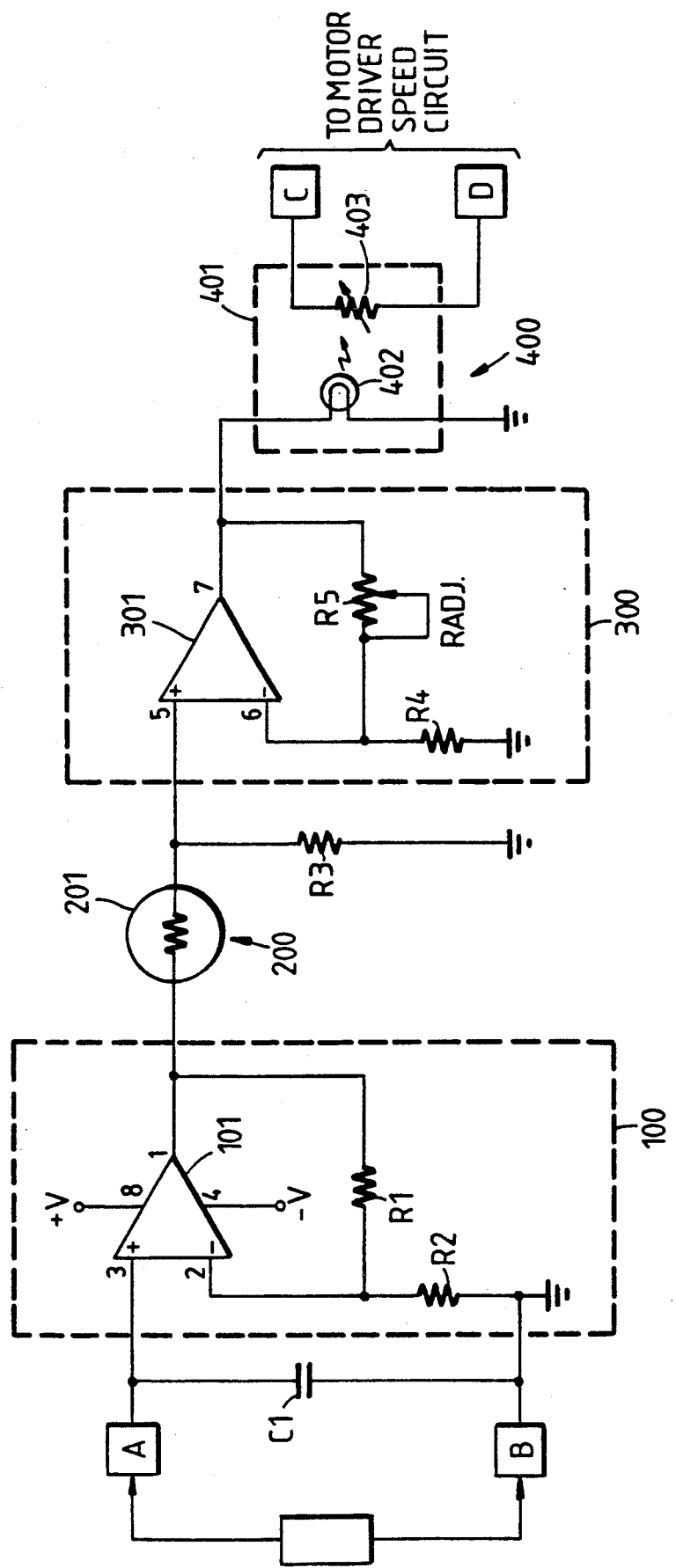
FIG. 2 depicts a preferred embodiment of temperature sensitive control circuitry of the present invention.

Now referring to FIG. 2, a detailed schematic corresponding to the block diagram of FIG. 1 is shown. A J-type thermocouple is used to convert the heating plate temperature to an electronic signal. The signal is applied across the plates of capacitor C1 at input terminals A and B. Capacitor C1 serves to filter high frequency noise from the thermocouple output signal. Input terminal A, also node 3, is connected to the noninverting input terminal of a standard operation amplifier 101. Resistor R1 is connected between amplifier output terminal 1 and amplifier input terminal 2, thereby forming a negative feedback loop. Also, connected between amplifier inverting input terminal 2 and ground is resistor R2. This ground connection is common to both capacitor C1 and input terminal B. For this embodiment, resistors R1 and R2 are chosen to provide operational amplifier 101 with a gain of approximately 100. Amplifier 101 and resistors R1 and R2 together form preamplification circuitry 100 which amplifies the thermocouple output voltage signal. Ambient temperature sensitive element 200 and amplification and calibration circuitry 300 are coupled in series between preamplifier 100 and voltage variable impedance device 400. In the embodiment shown in FIG. 2, ambient temperature sensitive element 200 is a glass encapsulated thermistor 201, such as Keystone part no. AL03006-5818-97-GI. The thermistor provides a variable resistive load on the output signal of preamplification circuitry 100. The load's impedance value is inversely proportional to temperature, and so as temperature increases, impedance decreases, and more of the output signal of preamplification circuitry 100 is allowed to pass to preamplification and calibration circuitry 300.

Thermistor 201 is coupled in series between node 1 and node 5, the noninverting input terminal of operational amplifier 301. R3 is connected between ground and node 5 to form a voltage divider at node 5. Resistors R5 and R4 are connected in the negative feedback loop of operational amplifier 301. R5 is a variable resistor coupled between operational amplifier output terminal 7 and inverting input terminal 6; R4 is a fixed value resistor connected between node 6 and ground. As discussed below, by varying R5, the operator may calibrate the control circuitry to compensate for variations in device values and to set the device to operate at a predetermined speed at known temperatures. The value of resistor R3 is selected so that the input voltage on node 5 is approximately in the middle of the calibration range provided by variable resistor R5.

Operational amplifier 301 and resistors R4 and R5 together form preamplification and calibration circuitry 300. This circuitry serves to amplify the signal output from thermistor 201 and to permit the operator to calibrate the control circuitry. The output from the preamplification and calibration circuitry 300 is input to voltage variable impedance element 400. In the embodiment shown in FIG. 2, voltage variable impedance element 400 is a photoresistor and light device such as Vactrol Model VTL9A2. Photoresistor and light device 401 includes a light source 402, the intensity of which varies with the voltage input, and a photoresistor 403. The impedance of photoresistor 403 is inversely proportional to the intensity of light source 402. The photoresistor impedance is output from the voltage variable impedance element 400 at outputs C and D. As the voltage output of preamplification and calibration circuitry 300 increases, the intensity of light device 402 increases, thereby decreasing the impedance of photoresistor 403. Thus, the present circuitry generates an impedance that is inversely proportional to both the temperature of heating plate 13 and the ambient temperature.

The value of the various resistors may vary depending on the desired output impedance. It should be observed that photoresistor and light source device 401 and the resistors should be selected so that device 401 operates linearly. When using a J-type thermocouple, a Keystone Part No. AL03006-5818-97-GI thermistor, and Vactrol Model VTL9A2 photoresistor and light source device, the following device values have been found to produce desirable results.

C1 = 0.01 microfarads
R1 = 909 K ohms
R2 = 9.09 K ohms
R3 = 8.91 K ohms
R4 = 8.91 K ohms
R5 = 0–100 K ohms variable When using these device values, the thermocouple output signal is approximately 19.3 mV when the heating plate temperature is 700° F., and the signal input to the thermistor is approximately 2 V. At ambient temperature of 74° F., the voltage at node 5 is 60 mV. Resistor R5 is calibrated so that the signal applied to the photoresistor and light source device is approximately 3 V, resulting in an output impedance of 120 K ohms.

Figure 4:
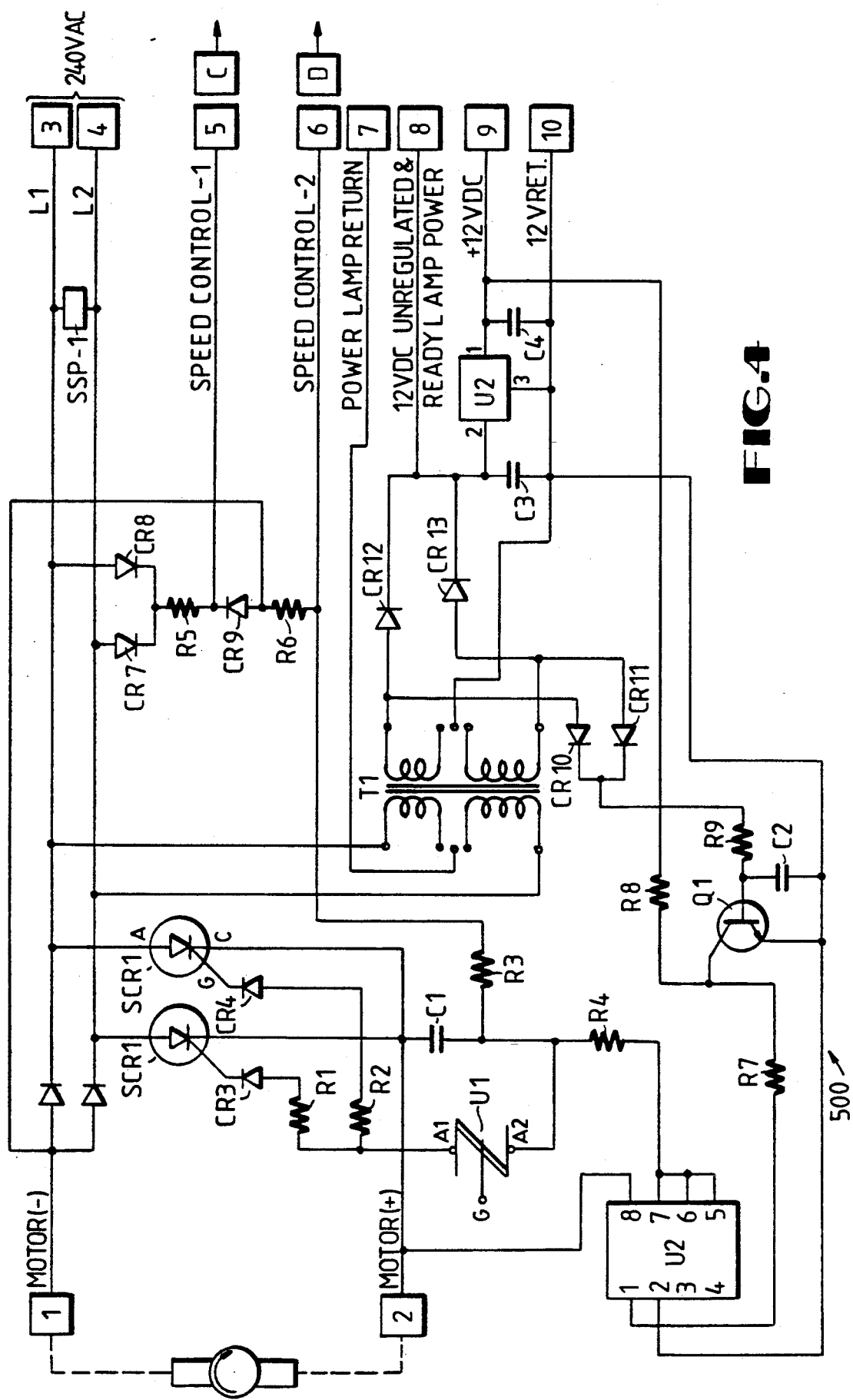
FIG. 4 depicts a drive motor circuitry for use in controlling the drive motor of a roofing membrane welding device as is known in the art.

Referring to FIG. 4, a typical motor drive circuit 500 is shown for continuously controlling the speed of a DC motor. The circuit is supplied with a 240 volt AC signal between input terminals 3 and 4. Of primary interest in this schematic is input terminals C and D which correspond to terminals C and D in FIG. 2. These terminals receive the variable impedance values output from voltage variable impedance element 400. The motor drive circuit 500 varies the speed of the drive motor in response to the variable impedance input. The details of the motor drive circuit and its operation are known in the art.

The operation of the circuitry of FIG. 2 is as follows. Similar to the block diagram of FIG. 1, the control circuit of FIG. 2 receives, at terminals A and B, a continuous input voltage signal from thermocouple 19. The thermocouple output is proportional to the temperature of the heating plate 13 in FIG. 1 and, therefore, also proportional to the temperature of roofing membrane 11.

The input signal from thermocouple 19 is applied to noninverting input terminal 3 of operational amplifier 101. Operational amplifier 101 amplifies the temperature dependent input signal and then passes the amplified signal to the input terminal of thermistor 201.

The variable signal from amplifier 100 is applied to the voltage dividing network formed by the instantaneous resistance value of thermistor 201 and the resistance value of R3 to produce a voltage at node 5. Because the resistance value of thermistor 201 is a function of the ambient temperature and the input signal to thermistor 201 varies with heating plate temperature, the voltage at node 5 varies with both the ambient temperature and the heating plate temperature. The resultant voltage at node 5 is amplified by operational amplifier 301. The gain of operational amplifier 301 is set by the relative impedance values of resistors R4 and R5. Since it may be necessary to calibrate the entire circuit shown in FIG. 2 using the variable resistance properties of R5, the gain of amplifier 30 is variable. For illustrative purposes, it is assumed that the gain is greater than 1; therefore, the output signal level of operational amplifier 301 will be greater than its input signal level. In the embodiment shown, the thermocouple output and the output of ambient temperature sensitive element 200 are amplified by amplifier circuits 101 and 300 to increase their low voltage levels; however, in some embodiments contemplated by this invention, amplification of the signals may not be required.

The output signal of amplifier 301 is input to the photoresistor and light source device 401, causing device 401 to assume an output impedance between output terminals C and D which is inversely proportional to the signal level at node 7. The output impedance between terminals C and D is applied to the motor driver speed circuit of FIG. 4, causing the drive motor to run faster or slower, responsive to changes in the impedance output of element 401. The motor speed of the roofing device 10 is controlled by the output impedance of the circuit of FIG. 2, and that impedance value is in turn dependent upon the ambient and heating plate temperatures.

Calibration of the speed control circuitry of FIG. 2 may be required in order to compensate for variations inherent in the different components and to correctly set the initial operating point of the described circuitry. The initial operating point is set such that the roofing device correctly responds to known environmental conditions. For example, the circuit may be calibrated so that the correct motor speed is obtained at predetermined temperature conditions such as a preset heating plate temperature of 700° F. and an ambient temperature of 74° F. In the circuit of FIG. 2, calibration of the control circuitry is accomplished by maintaining the above-mentioned temperatures while simultaneously adjusting variable resistor R5 to give an output impedance of 120 K ohms between output terminals C and D. Adjusting R5 changes the gain of operational amplifier 301 so that an appropriate voltage appears at node 7, which effectively causes the photoresistor and light source device 401 to output the desired impedance.

Once the circuitry of FIG. 2 is correctly calibrated, its operation will continuously control the motor speed of the roofing device based on the ambient temperature and the heating plate temperature. To more particularly point out how this circuitry controls motor speed as a function of heating plate temperature and ambient temperature, an illustrative example follows. The example begins by assuming a constant ambient temperature. As the temperature on the heating plate decreases, possibly by heat dissipation into the membrane material, the voltage output signal from the thermocouple decreases. Since the gain of operational amplifier 101 is fixed, the output voltage at node 1 decreases. If ambient temperature remains constant, the resistance value of thermistor 201 is constant, and a reduced voltage at node 1 also produces a reduced voltage at input node 5. Similar to operational amplifier 101, operational amplifier 301 outputs a reduced voltage in response to its reduced input voltage level. The output signal from amplifier 301 is applied to photoresistor and light source device 401. As the output voltage decreases, the intensity of light source 402 decreases, and the impedance of photoresistor 403 increases. Thus, in this example, the impedance value at output terminals C and D increases. This increased impedance causes the motor drive speed circuit shown in FIG. 4 to decrease the speed of the welding device motor. By decreasing the speed of the welding device motor in response to a temperature decrease on the heating plate, the membrane is allowed to remain on the heating plate for a longer period of time, thereby increasing the heat applied to the membrane so that its application temperature increases to the desired level.

Another working example for the circuitry of FIG. 2 might involve a change in ambient temperature. For simplicity, the heating plate temperature is assumed constant. If the heating plate temperature is constant, the output voltage at node 1 is also constant. If the ambient temperature rises, the impedance value of thermistor 201 decreases, thereby allowing more of the voltage at node 1 to pass to node 5. The increased voltage at node 5 produces an increased voltage at node 7, which in turn reduces the output impedance between output terminals C and D. This reduced output impedance between output terminals C and D causes the drive motor speed circuit to increase the speed of the drive motor. By increasing the speed of the motor, the time the membrane material is allowed to remain on the heating plate is shortened, decreasing the heat applied to the membrane by the heating plate. The control circuitry has effectively recognized that the ambient temperature has, to some extent, heated the membrane prior to its contact with the heating plate.

Figure 3:
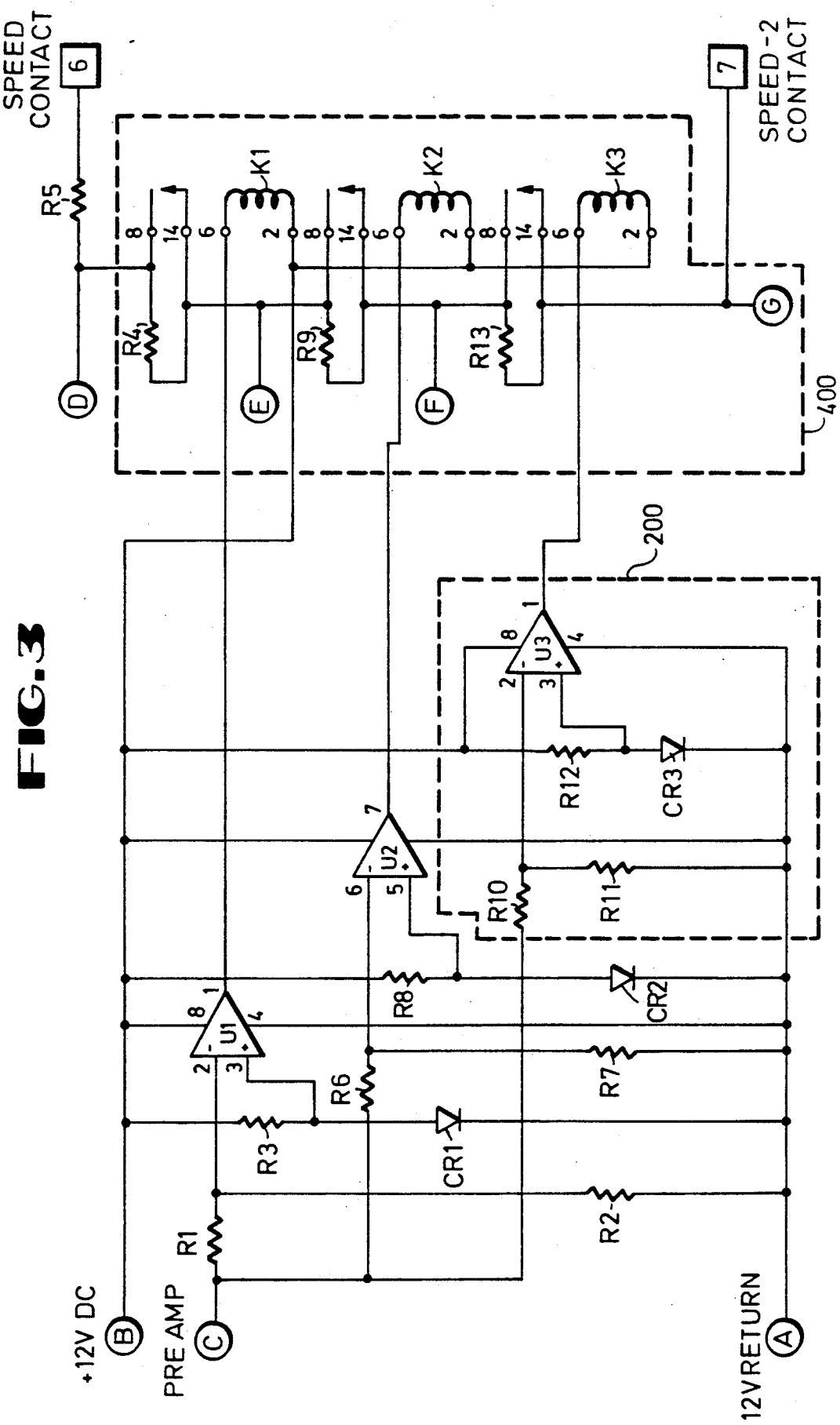
FIG. 3 depicts a second preferred embodiment of the temperature sensitive control circuitry of the present invention.

Referring now to FIG. 3, therein is shown another preferred embodiment of the present invention. FIG. 3 depicts a portion of a stepped motor speed control circuit. This circuit outputs a stepped resistance value as a function of ambient temperature and temperature of the heating plate. The circuit shown in FIG. 3 includes the ambient temperature sensitive element 200 and voltage variable impedance element 400 previously discussed with reference to FIG. 1. The circuit of FIG. 3 is comprised of three ambient temperature sensitive circuits, one of which is delineated by dashed lines and reference numeral 200. Each ambient temperature sensitive circuit includes a comparator biased by a 12 volt power supply, a diode, and three resistors. The first ambient temperature sensitive circuit is comprised of resistors R1, R2 and R3, comparator U1 and diode CR1. The second ambient temperature sensitive circuit is comprised of resistors R6, R7 and R8, comparator U2 and diode CR2. The third ambient temperature sensitive circuit is comprised of resistors R10, R11 and R12, comparator U3 and diode CR3.

Preamp signal C corresponds to the output voltage at node 1 in FIG. 2. Preamp signal C is coupled to the inverting input terminal of each of the comparators U1, U2 and U3 of the ambient temperature sensitive circuits. The preamp signal is coupled to each of the three comparators through a voltage dividing network comprised of R1 and R2, R6 and R7, and R10 and R11, respectively. More specifically, the inverting terminal of each comparator is connected between each of the respective resistors.

A reference potential is coupled to the noninverting input terminal of each of the comparators U1, U2 and U3 of the ambient temperature sensitive circuits. Each of the three reference potentials is generated from a series-connected diode and precision bias resistor, specifically, diode CR1 and resistor R3, diode CR3 and resistor R8, and diode CR3 and resistor R12, respectively. Diodes CR1, CR2 and CR3 may be identical. Similarly, resistors R3, R8 and R12 may have equal resistivities. Each noninverting input terminal is connected between a diode and its precision bias resistor; the diode being connected in a manner which allows current to flow from a voltage supply to ground. By carefully selecting precision bias resistors, the diodes are biased to operate exclusively in a region for which the voltage across the diodes is temperature dependent. Thus, if the ambient temperature goes down, the reference voltage goes up, and vice versa.

Each comparator of each ambient temperature sensitive circuit is designed to output a 12 volt signal as long as the preamp signal C does not exceed the reference potential generated by the series-connected diode and precision bias resistor. When the preamp signal C exceeds the reference potential on a comparator, the output of that comparator goes to zero volts. Because the diode of each ambient temperature sensitive circuit is biased to operate in the temperature sensitive range, the reference potential in each ambient temperature sensitive circuit of FIG. 3 changes in response to changes in ambient temperature. Thus, the voltage at which preamp signal C exceeds or falls below the reference potential varies with ambient temperature. Moreover, as discussed above with reference to FIGS. 1 and 2, preamp signal C varies with the heating plate temperature.

The output from each comparator U1, U2 and U3 of each temperature sensitive circuit 200 is input to a voltage variable impedance circuit element 400. The voltage variable impedance circuit of FIG. 3 is formed by three relays, K1, K2 and K3 and three corresponding resistors, R4, R9 and R18, respectively. Each relay, K1, K2 and K3 is coupled in series between the output of a comparator of one of the ambient temperature sensitive circuits 200 and a 12 volt power supply. The relay is designed so that if the comparator output is 12 volts, the relay is turned off. If the comparator output falls to zero, the relay is turned on.

When a relay is tripped, it operates to short out the corresponding resistor. The output impedance of the voltage variable impedance element 400 directly corresponds to the number of resistors, R4, R9 and R18, connected in the circuit. Thus, the output impedance of element 400 directly corresponds to the number of relays that are turned on or off.

The operation of the circuit of FIG. 3 is as follows. The circuit of FIG. 3 is designed so that the impedance value of R2 is greater than R7, the impedance value of R7 is greater than R11, and R1, R6 and R10 all have equal impedance values. Thus, the voltage of input preamp signal C required to trip each comparator increases from comparator U1 to U3. Hence, as the voltage at input terminal C increases, a direct result of an increased temperature on the heating plate 13 of FIG. 1, the voltage on input terminal 2 of comparator U1 will eventually exceed the reference voltage on terminal 3. Thus, comparator U1 will trip, effectively decreasing its output voltage at node 1 from 12 volts to 0 volts and thereby turning on relay K1. Turning on relay K1 shorts out resistor R1, decreasing the output impedance from element 400. As the voltage at preamp node C continues to rise, the input to the noninverting terminal of comparator U2 will exceed the reference voltage, thereby driving its output to zero volts and activating relay K2, shorting out resistor R9 and again decreasing the output impedance of element 400. The scenario continues for comparator U3, relay K3 and resistor R18. Thus, as each relay is activated, the impedance between output terminals 6 and 7 decreases in incremental amounts. The incremental or step impedance values are supplied to the motor driver speed circuit described by FIG. 4, which in turn controls the speed of the roof welding device motor. For each relay activated, the motor speed increases since the impedance level at the output of the circuit in FIG. 3 is decreased. The values of resistors R4, R9 and R18 are selected to give the desired stepped impedance outputs. In the embodiment shown in FIG. 3, three ambient temperature sensitive circuits and relay-resistor pairs are provided, giving the circuit the possibility of four stepped impedance outputs. Depending on the requirement of the roofing operation, more or fewer steps may be provided by simply adding or subtracting ambient temperature sensitive circuits and relay-resistor pairs.

As an illustrative example for the circuitry of FIG. 3, consider the occasion where the ambient temperature is changing while the heating plate temperature remains constant. If the ambient temperature decreases, the reference voltage increases on each inverting terminal of each comparator, thereby requiring a higher preamp input voltage at input terminal C to trip each comparator. Since the voltage at input terminal C is assumed constant in the example when heating plate temperature is constant, the increased reference voltage maintains any existing high comparator output and may drive high those comparator outputs that were low, if the increased reference potential on the comparator exceeds the preamp signal C. The comparator inputs that are driven high turn off the corresponding relays, effectively increasing the output impedance of element 400. The increased output impedance, which is coupled to the drive motor speed circuit, acts to slow the speed of the roofing device motor. Hence, the membrane is allowed to remain in contact with the heating plate longer, compensating for the decreased ambient temperature. Those skilled in the art will recognize other variations and combinations of temperature changes and their effects on the described circuits.

Many modifications and variations may be made in the techniques and structures described and illustrated herein without departing from the spirit and scope of the present invention. Accordingly, the techniques and circuits described herein are illustrative only and are not to be considered as limitations upon the scope of the present invention.

What is claimed is:

1. A circuit for controlling the speed of an electric motor in response to changes in temperature, comprising:
   first means for generating a first voltage responsive to a first temperature;
   second means for generating a second voltage, said second voltage comprising a voltage proportional to said first voltage reduced by an amount proportional to a second temperature; and
   a variable impedance device connected between said motor and a source of electric power;
   third means for controlling the impedance of said variable impedance device in response to the magnitude of said second voltage.

2. The motor control circuit of claim 1, wherein said first means for generating said first voltage comprises a thermocouple.

3. The motor control circuit of claim 1, wherein said second means for generating said second voltage comprises a thermistor coupled in series with said first means for generating said first voltage.

4. The motor control circuit of claim 1, wherein second means for generating said second voltage comprises:
   a voltage source;
   a diode; and
   a precision bias resistor coupled in series with said voltage source and said diode;
   said precision bias resistor adapted to bias said diode to operate exclusively in a region for which the voltage across said diode is temperature dependent.

5. The motor control circuit of claim 1, wherein said third means comprises a light source adapted to receive said second voltage and a photoresistor having a variable impedance responsive to changes in intensity of said light source.

6. A motor control circuit for providing a variable impedance for use in controlling the speed of a roofing membrane welding device having a heating plate for heating a length of roofing membrane, comprising:
   a thermocouple mounted on said heating plate and adapted to generate a first voltage responsive to a temperature of said heating plate;
   means for receiving said first voltage and generating a second voltage, said second voltage comprising a voltage proportional to said first voltage reduced by an amount proportional to an ambient temperature; and
   a variable impedance device connected between said motor and a source of electric power;
   means for controlling the impedance of said variable impedance device in response to the magnitude of said second voltage.

7. The motor control circuit of claim 6, wherein said means for generating said second voltage comprises a thermistor coupled in series with said thermocouple.

8. The motor control circuit of claim 6, wherein said controlling means comprises a light source coupled in series with said thermocouple and said first means, and a photoresistor having an impedance responsive to the intensity of said light source.

9. The motor control circuit of claim 6, further comprising an amplifier for amplifying said first voltage.

10. The motor control circuit of claim 6, further comprising an amplifier for amplifying said second voltage.

11. The motor control circuit of claim 6, further comprising a calibration circuit.

12. A motor control circuit for supplying an impedance that varies in response to temperature, comprising:
    first means for providing a first voltage in proportion to a first temperature;
    second means for supplying a second voltage response to said first voltage being within a first range;
    third means for supplying a third voltage in response to said first voltage being within a second range;
    fourth means for providing an impedance that varies in response to the said second and third voltages, comprising:
    a first impedance device;
    a first relay attached to said first impedance device and adapted for shorting said first impedance device in response to receiving said second voltage;
    a second impedance device electrically attached in series to said first impedance device; and
    a second relay attached to said second impedance device and adapted for shorting said second impedance device response to receiving said third voltage.

* * * * *